G. T. BASSETT.
Meat-Press.

No. 224,629. Patented Feb. 17, 1880.

Witnesses.
S. N. Piper
W. H. Lunt

Inventor.
George T. Bassett.
by attorney
R. H. Eddy

UNITED STATES PATENT OFFICE.

GEORGE T. BASSETT, OF HARWICH, MASSACHUSETTS.

MEAT-PRESS.

SPECIFICATION forming part of Letters Patent No. 224,629, dated February 17, 1880.

Application filed January 12, 1880.

*To all whom it may concern:*

Be it known that I, GEORGE T. BASSETT, of Harwich, in the county of Barnstable and State of Massachusetts, have invented a new and useful Improvement in Meat-Presses; and I do hereby declare the same to be described in the following specification, and represented in the accompanying drawings, of which—

Figure 1:
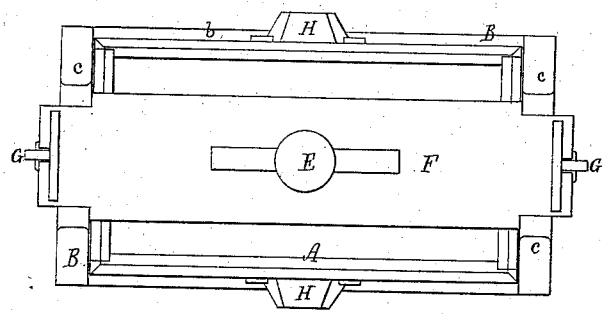
Figure 2:
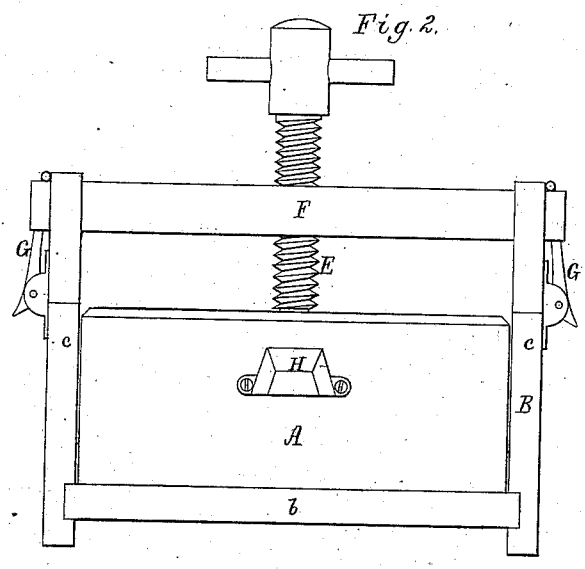
Figure 3:
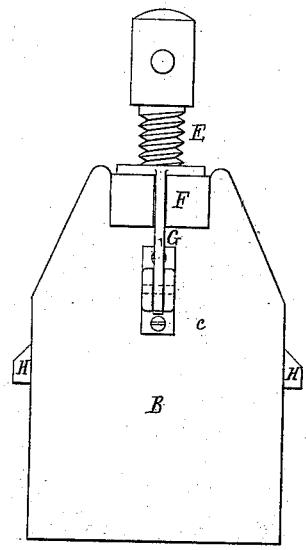
Figure 4:
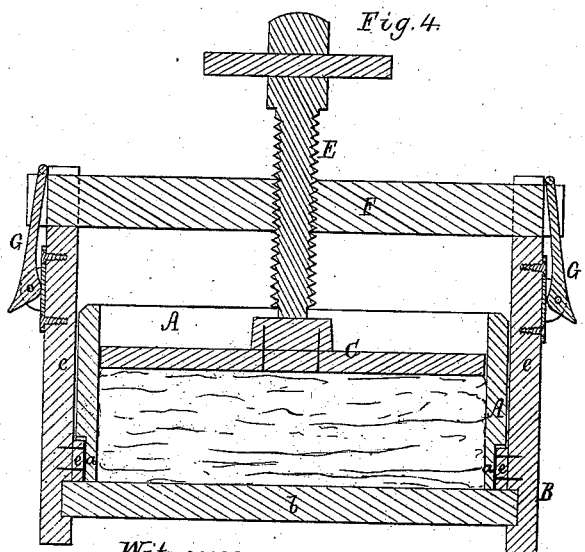
Figure 5:
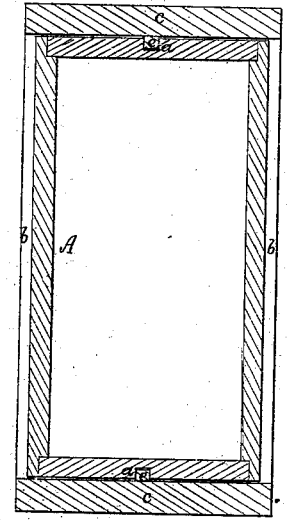

Figure 1 is a top view, Fig. 2 a front elevation, Fig. 3 an end view, and Fig. 4 a longitudinal section, of a press containing my invention. Fig. 5 is a horizontal section taken through the stand or frame and the press-box.

My invention relates to an improved press for compressing meat or other matters, such press consisting of a box open at its top and bottom, and provided with notches in its ends, in combination with a separate supporting-frame having projections to enter the notches, and also having a separate cross-bar and devices for connecting it with the frame, such cross-bar having screwed into and through it a screw to act upon a platen in order to force it into the box.

In the drawings, A represents the box, open at the top and bottom, and having notches or recesses $a\ a$ arranged in the lower parts of its opposite ends and at their middles, in manner as represented.

B is the frame, composed of a base or flat board, $b$, and two posts or standards, $c\ c$, extending upward from it perpendicularly, each of said posts or standards being at its lower part and on its inner side provided with a tenon or projection, $e$, to enter one of the notches $a$, such notch being open at its lower end. The said projections and notches serve to bring the box into its proper position in the frame, and to hold it in place for meat or other matters to be pressed into it. Within the said box is a platen, C, over whose center is a screw, E, that screws down into and through a cross-bar, F, which rests and fits upon the tops of the posts. These posts are provided with clasps or yokes G G, which are hinged to them, so as to be capable of being turned up over and upon the cross-bar in a manner to hold it down, in connection with the post, under the upward pressure of the screw. Thus it will be seen that by means of the devices G G the cross-bar may be connected with the posts, or may be disconnected from them preparatory to its removal from such posts.

In using this press the box is first to be put in place between the posts and on the bed or base of the frame, after which such box is to receive its charge of meat or other matter to be pressed. Next the cross-bar is to be applied and secured to the posts, and the platen is to be introduced into the box, and the screw is to be revolved so as to cause it to force the platen downward upon the mass in the box.

After the meat may have thus been pressed, and while it is under pressure of the platen, the box, by means of draw-pulls H H, fixed to its opposite sides, is to be pulled upward above the meat, and the screw is to be unscrewed, and the cross-bar is to be removed from the posts, and finally the platen is to be raised off the meat, which will be found to have been reduced to a cake.

What I claim as my invention is as follows:

The box A, open at its top and bottom, and provided with notches $a\ a$, arranged as set forth in its ends, and also with the draw-pulls H H, in combination with the frame B, composed of the base-board $b$ and posts $c\ c$, and provided with projections $e$ to enter the notches $a$, and with the separate cross-bar F and the devices G G for connecting it to the posts, such cross-bar having a screw to operate a platen, when arranged in the box as explained.

GEORGE T. BASSETT.

Witnesses:
R. H. EDDY,
W. W. LUNT.